United States Patent Office 3,377,650
Patented Apr. 16, 1968

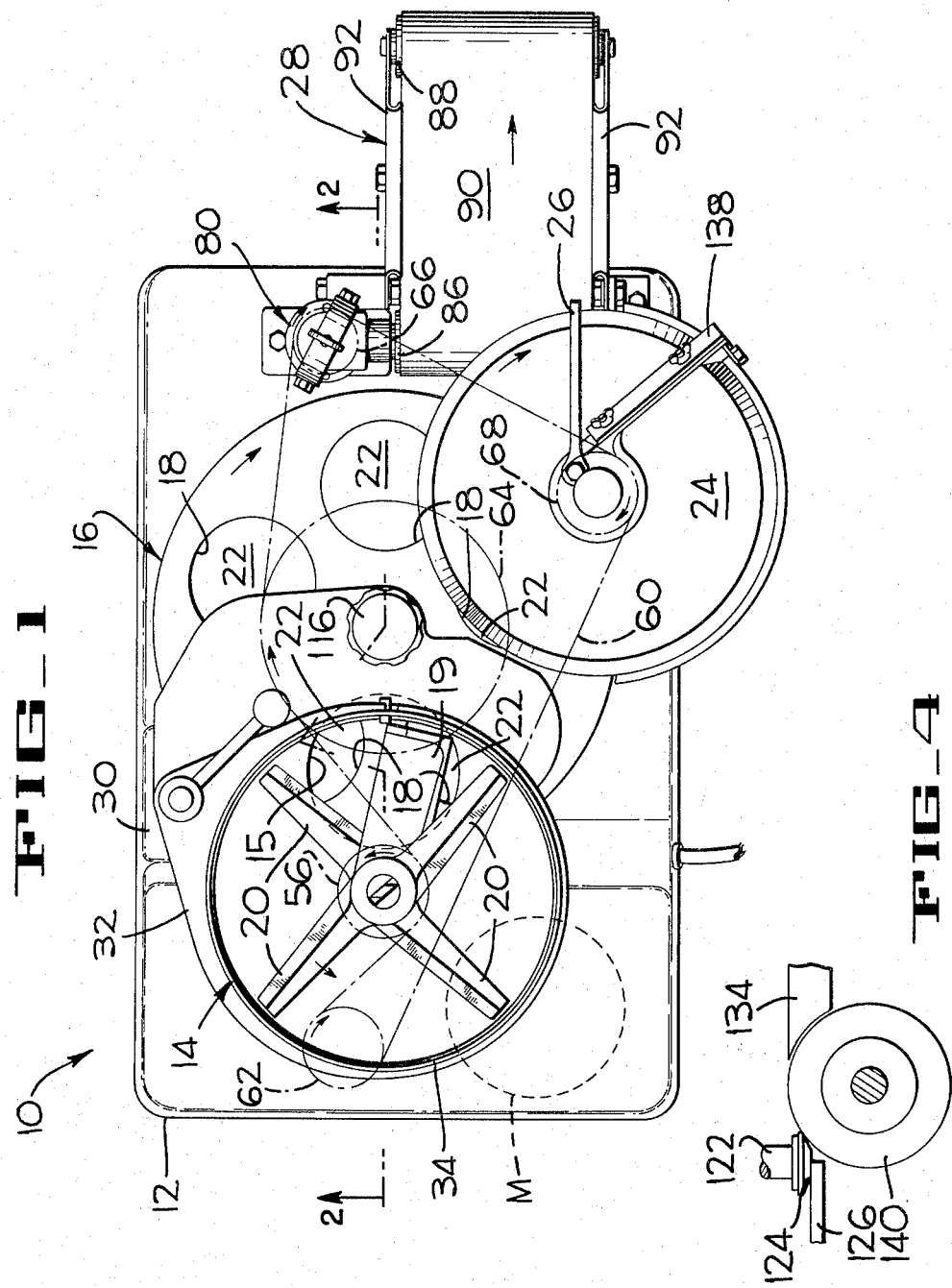

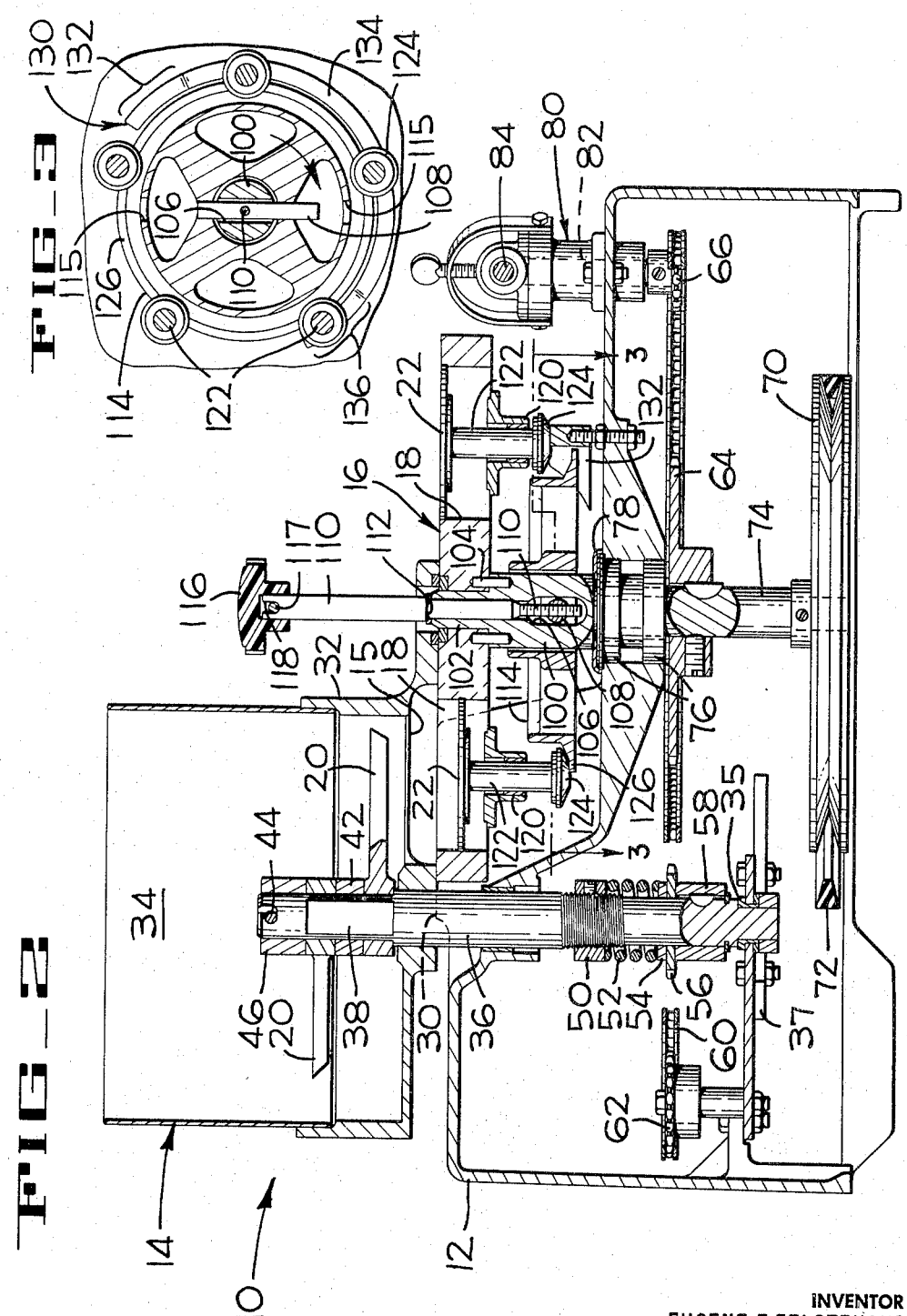

3,377,650
FOOD MOLDING MACHINE
Eugene F. Felstehausen, Hoopeston, Ill., assignor to FMC Corporation, San Jose, Calif., a corporation of Delaware
Filed May 23, 1966, Ser. No. 552,009
5 Claims. (Cl. 17—32)

The present invention pertains to food molding machines for forming ground meat into patties of predetermined shape and weight. More specifically, the invention provides improved mechanism in such a machine for regulating the size of the patties to be formed.

One type of molding machine now in general use, such as the type of molding machine in the U.S. patent of Garfunkel 2,702,405 includes means for filling ground meat into axial turret pockets or cylinders that each have a movable piston forming the bottom wall of the pocket. A piston rod depends from the piston and rides atop a non-rotatable cam plate which can be vertically adjusted to position the pistons at some predetermined depth in the pockets. The capacity of the pockets can thus be regulated so that the thickness, and hence weight, of the resulting patties can be controlled.

One disadvantage of this type of prior art molding machine, especially those machines which handle frozen ground meat, is that excessive wear of the piston rods and cam plate occurs except when the turret is driven at relatively low speeds. Thus, this type of molding machine cannot maintain high production rates without rapid wear and being subject to frequent maintenance or repair.

The molding machine of the present invention virtually eliminates wear of the piston rods and cam plate by providing a piston rod and cam plate assembly which rotates with the turret pockets so that there is no relative lateral motion between the piston rods and the cam plate. As a direct result of this improved mechanism, the machine can operate at higher than usual speeds, and exceeds the production rate of the type of prior art molding machine noted above, without proportionately increasing wear on the piston rods and cam plate.

An object of the present invention is to provide a food molding machine which can efficiently maintain high production rates without incurring excessive wear.

Another object is to provide a improved piston-depth control mechanism for the turret pockets of a food molding machine.

Another object is to provide a food molding machine which will handle ground, frozen meat at high production rates without excessive wear.

A further object is to provide a high output food molding machine which is less costly and more durable than present molding machines capable of achieving the same output.

Other objects and advantages of the present invention will become apparent from the following description, and from the accompanying drawings, wherein:

FIGURE 1 is a plan of the food molding machine of the present invention.

FIGURE 2 is a vertical section taken along lines 2—2 of FIGURE 1.

FIGURE 3 is a horizontal section taken along lines 3—3 on FIGURE 2.

FIGURE 4 is a diagrammatic section of a modified structure of the lift cam approach ramp.

Briefly, the food molding machine 10 (FIGS. 1 and 2) includes a hollow base housing 12 which supports a cylindrical hopper 14 having a discharge outlet 15. The outlet 15 overlies one edge of a rotatable turret 16 having a plurality of axial pockets 18 which, as the turret rotates, are successively moved under the outlet 15. Frozen ground meat within the hopper is ejected downward, under a conventional feed blade 19, through the outlet 15 and into the turret pockets 18 by driven impeller blades 20. The turret 16 rotates clockwise as viewed in FIGURE 1, and the bottom wall of each pocket is formed by a piston 22 which is movable between a preset lowermost position to an uppermost position in which the piston is flush with the upper surface of the turret 16 and the patty thus lies above said surface. After a filled pocket 18 moves out from under the hopper 14 and its piston is raised flush with the turret, it moves under a rotatable circular spatula knife 24. The spatula knife lifts the patty from the piston and carries the patty diagonally against a fixed stripper blade 26. The patty is thereby deflected onto a takeaway conveyor belt 28, after which it may be wrapped, frozen and stored with other formed patties, or otherwise disposed of. The present invention particularly concerns the mechanism to adjust the pistons 22 in the pockets 18.

With more specific reference to FIGURES 1 and 2, the base housing 12 has a raised portion at 30, to which a hopper support casting 32 is releasably secured. The casting 32 forms the bottom wall of the hopper 14 and releasably retains a cylindrical wall 34 which forms the side wall of the hopper. Concentrically mounted within the hopper is an impeller shaft 36 which is supported in a bearing 35, that is mounted in a fixed bracket 37, and is provided with a square upper end portion 38. The impeller blades 20 have hub portions, separated by a spacer 42, with square apertures to provide a positive drive connection to the impeller shaft 36. A radial pin 44 is secured to shaft 36 and is locked in a J-slot in a collar 46 to releasably retain the impellers on the shaft 36.

The lower end portion of the impeller shaft 36 has a collar 50 threaded thereon above a spring 52. The spring is compressed between the collar 50 and a thrust washer 54 that is pressed downward by the spring into frictional engagement with a hubless sprocket 56. A hub 58 supports the sprocket and is keyed to the impeller shaft. A roller chain 60, which lies partly out of the plane of section of FIGURE 2, and is indicated by a pitch line in FIGURE 1, drives the sprocket 56. The spring 52 and the adjacent collars provide a releasable friction-drive connection to the impeller blades 20 so that if the blades should become jammed, the shaft 36 will not rotate and the drive mechanism cannot be damaged.

The drive train includes an idler sprocket 62 (FIG. 2), a turret sprocket 64, a conveyor drive sprocket 66 and a spatula drive sprocket 68 (FIG. 1), the power for all of which originates from an electric motor M. The motor has a pulley, not shown, which is horizontally aligned with and drives a turret drive pulley 70 (FIG. 2) by means of a V-belt 72. The pulley 70 and sprocket 64 are secured to a rotatable turret shaft 74 that is axially fixed in bearings 76 and projects upward through the base 12 and through a seal cap 78 that seals off the mechanism within the hollow base housing 12.

Drive means for the takeaway conveyor 28 includes a right-angle gear drive unit 80, a vertical shaft 82 of which carries the conveyor drive sprocket 66 and powers a horizontal shaft 84 (FIG. 2) in a manner previously known. Other known elements of the takeaway conveyor include a drive pulley 86 on the shaft 84, an idler pulley 88, an endless belt 90 trained around said pulleys, and cantilever brackets 92 which project from the base 12 and support the takeaway conveyor 28.

As thus far described, the molding machine 10 comprises elements which in general are known from the prior art and operate in accord with principles previously used in food molding machines. The ensuing description is directed primarily to the novel features of the present invention in association with the turret 16.

Above the seal cap 78 (FIG. 2), the turret shaft 74 has an enlarged elongate hub 100 and a smaller diameter neck 102 above the hub to provide a radial shoulder for supporting the turret 16. Pins 104 are fixed in the hub and releasably secure the turret for rotation with the hub. The neck and hub are each provided with an axial bore which communicates with a lateral slot 106 (FIGS. 2 and 3) in the hub 100. A cross pin 108 is disposed in the slot 106. To accommodate vertical movement of the pin 108, the slot 106 is elongated axially of the hub 100 and the diameter of the pin is slightly less than the width of the slot 106. Threaded through the cross pin 108 and slidably disposed within the axial bore of the neck 102 and the hub 100 is the lower end portion of an adjustment rod 110. Rotation of the rod 110 vertically moves the cross pin 108 to preset the lowermost position of the pistons 22, and thus regulate the capacity of the pockets 18 when the pockets are in their filling position.

For this purpose, the adjustment rod 110 has a shoulder at 112 which rests atop the end of the neck 102, and the cross pin 108 (FIG. 3) extends through apertures in a cam plate 114 which circumscribes the hub 100 and is axially slidable thereon. Radial apertures 115 in the cam plate 114 allow for installation and removal of the cross pin 108. With the described construction, the cam plate 114 can be vertically adjusted toward and away from the turret pockets 18 by rotating a knob 116 which is removably coupled to the upper end of the adjustment rod 110 by a pin 117 that is secured to the knob and engages the walls of a slot 118 in the shaft 110. Concentrically mounted to the turret 16 under each pocket 18 (the attachment bolts of which are not shown due to the plane of section) is a tubular piston rod guide 120 that centers the piston 22 in the pocket and slidably receives its piston rod 122. Each piston rod 122 has an enlarged lower end cam follower 124, the end of which partially overlies the upper surface of a radial flange 126 of cam plate 114.

As shown in FIGURE 3, in the sector of their circular path beneath the hopper 14 the cam followers 124 are free to engage the cam plate 114 as the frozen ground meat in the hopper is forced downward through the outlet 15 (FIG. 2) by the impeller blades 20. Thus, each piston 22, if it does not drop by gravity, is forced downward to its positive stop position as determined by the elevation of the cam plate 114.

Positive drive of the cam plate 114 with the turret 16 is afforded by the cross pin 108 engaging one wall of the slot 106 when the machine is in operation. However, the downward force of the pistons as they are pushed downward by the incoming charge of ground meat, provides sufficient frictional interengagement of the cam followers 124 with the cam plate flange 126 to prevent the cam plate 114 from rotating back and forth relative to the turret 116—as would otherwise occur because the cross pin 108 is smaller than the slot 106 in the hub 100 to facilitate up and down adjustment of the cam plate. One important feature of the described piston and cam plate arrangement is that because no relative sliding motion occurs between the cam followers 124 and the cam plate 114, galling and wear of the followers and plate is effectively prevented, and the turret can safely operate at relatively high speed. Another important feature is that the molding machine 10 will operate at high speed and yet withstand the forces caused by charging the pockets 18 with frozen meat particles, whereas some of the molding machines now used cannot handle frozen materials at high speed. The ground, frozen meat may be at a temperature as low as 20–23 degrees F. when introduced into the molding machine 10, and does not undergo any appreciable temperature increase while it is formed into patties.

It will be noted that only about half of each end surface of a cam follower 124 (FIGS. 2 and 3) contacts the cam plate flange 126. Partially circumscribing the cam plate 114 is a stationary lift cam 130 having an upwardly inclined approach ramp 132, a horizontal dwell section 134, and a declining terminal ramp 136; these surfaces underlie the path of the other portions of the end surfaces of the cam followers 124. Thus, when a follower progresses onto the approach ramp 132, it begins to raise its piston 22 and the meat patty in the pocket 18 is projected upwardly from the upper surface of the turret 16. When the same follower is on the dwell section 134, the top of the piston 22 is flush with the upper surface of the turret, within a very small fractional dimension, and there is no downward pressure on the piston except for the force of gravity. The top of the piston is also flush with the undersurface of the rotating spatula knife 24 (FIG. 1) and the meat patty is thereby separated from the piston, thrust diagonally against the fixed stripper blade 26, and moved onto the takeaway conveyor 28. Any small particles of meat which may adhere to the spatula knife 24 are removed by a fixed scraper blade 138 (FIG. 1) which lightly contacts the upper surface of the spatula knife.

Returning now to that part of the machine cycle where a cam follower 124 (FIG. 3) slides onto the approach ramp 132, FIGURE 4 diagrammatically illustrates an alternate form of approach ramp which effectively reduces wear on the cam followers. For this purpose, a freely rotatable, large diameter fixed roller 140 is used in place of the approach ramp 132, whereby the cam follower 124, as it leaves the cam plate flange 126, frictionally drives the roller 140 so that relative sliding motion is minimized between the roller and the cam follower while the cam follower is being lifted onto the dwell section 134. A further possible refinement which is not illustrated herein but is old in the art is to use a roller type of cam follower in lieu of each of the cam followers 124. However, this requires guide means to prevent rotation of the piston rods 122, and is a more expensive structure which is only warranted for molding machines having extremely high production rates, such as in the order of 10,000 patties per hour.

In addition to the improved control mechanism herein described for regulating the size of the pocket 18, the machine can easily be disassembled for cleaning due to the particular construction and arrangemnt of the machine components. After the knob 116 is removed, the hopper 14 and associated parts are removed in a conventional manner. The adjustment rod 110 is then unscrewed from the cross pin 108, and the turret 16 is lifted off the pins 104. Following this, the cross pin 108 is pulled through one of the cam plate apertures 115 and the cam plate 114 is removed, thus completing the disassembly required for thorough cleaning of all parts exterior of the base housing 12.

While a particular embodiment of the apparatus of the present invention has been herein shown and described, it will be apparent that modification and variation may be made without departing from the spirit of the invention, and that the scope of the invention should be limited only by proper interpretation of the claims appended hereto.

Having thus described the invention, that which is believed to be new, and for which protection by Letters Patent is desired, is:

1. In a food molding machine including a rotatable driveshaft, a turret mounted upon said driveshaft and defining a plurality of filling pockets equidistantly spaced about the turning axis of said driveshaft, one end wall of each of said pockets being formed by a movable piston having a depending piston rod, the improvement comprising a circular cam plate circumscribing said driveshaft adjacent said turret in confronting relation to the ends of said piston rods, means defining a transverse aperture in said drive shaft, means defining an aperture in said cam plate in alignment with said driveshaft aperture, a cross pin mounted in said apertures so that the cam plate rotates with the turret and piston rods, and means defining a planar surface on said cam plate in supporting engagement with said piston rods to maintain the pistons at a uniform predetermined elevation within the filling pockets.

2. Apparatus according to claim 1 wherein said cross pin is movable toward and away from said turret, and wherein said driveshaft aperture is elongate in the direction of said cross pin movement, and adjustment means coupled to said cross pin for moving said cam plate axially toward and away from said turret, the interspacing of the cam plate and turret thus being variable to regulate the position of said pistons within the filling pockets.

3. Apparatus according to claim 1 wherein the driveshaft aperture is elongate axially of the driveshaft, and wherein said driveshaft defines an axial bore communicating with said aperture and extending through said turret, and an actuating rod rotatably, slidably mounted in said axial bore and projecting beyond the plane of said turret, said rod having a shouldered portion seated on the adjacent end of said driveshaft and a threaded end portion engaged with corresponding threads in a through aperture portion of said cross shaft, rotation of said actuating rod relative to said driveshaft thus altering the interspacing of said cam plate and said turret and correspondingly moving said pistons in the filling pockets.

4. Apparatus according to claim 1 and further including a fixed arcuate lift cam contiguous to a circumferential segment of said cam plate; a cam follower integral with the free end portion of each of said piston rods; each of said cam followers partially overlying both said lift cam and said planar cam plate surface during movement of said turret; said lift cam having an approach ramp portion inclining upward from a horizontal plane including said planar surface to lift successive cam followers from the surface, a dwell portion at which the pistons of the thus lifted cam followers lie flush with the upper surface of the turret, and a declining terminal ramp portion which returns the cam followers into supported engagement with said cam plate.

5. Apparatus according to claim 4 wherein said lift cam approach ramp portion comprises a freely rotatable roller.

References Cited
UNITED STATES PATENTS

| | | | |
|---|---|---|---|
| 2,702,405 | 2/1955 | Garfunkel | 17—32 |
| 3,060,493 | 10/1962 | Weien | 17—32 |

LUCIE H. LAUDENSLAGER, *Primary Examiner.*